United States Patent
Tanase et al.

(10) Patent No.: US 6,532,196 B2
(45) Date of Patent: Mar. 11, 2003

(54) MAGNETO-OPTICAL RECORDING MEDIUM COMPRISING RECORDING LAYER AND REPRODUCING LAYER

(75) Inventors: Kenji Tanase, Gifu (JP); Yoshihisa Suzuki, Bisai (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/040,434

(22) Filed: Jan. 9, 2002

(65) Prior Publication Data

US 2002/0054544 A1 May 9, 2002

Related U.S. Application Data

(62) Division of application No. 09/160,045, filed on Sep. 25, 1998, now Pat. No. 6,400,656.

(30) Foreign Application Priority Data

Oct. 13, 1997 (JP) .............................. 9-279026
Dec. 15, 1997 (JP) .............................. 9-345085

(51) Int. Cl.$^7$ .............................................. G11B 11/00
(52) U.S. Cl. .............................. 369/13.43; 369/13.07; 428/694 MM
(58) Field of Search .......................... 369/13.17, 13.44, 369/13.07, 13.35, 13.41, 13.08, 13.09, 13.43, 288, 275.2, 275.3, 13.46, 13.42; 428/694 ML, 694 EC, 694 MM, 694 RE

(56) References Cited

U.S. PATENT DOCUMENTS

| | | | |
|---|---|---|---|
| 5,623,458 A | 4/1997 | Matsumoto et al. | 369/13 |
| 5,790,513 A | 8/1998 | Hiroki et al. | 369/275.2 |
| 5,862,105 A | 1/1999 | Nishimura | 369/13 |
| 5,879,822 A | 3/1999 | Okada | 428/694 RE |
| 5,939,187 A | 8/1999 | Hirokane et al. | 428/332 |
| 6,030,716 A * | 2/2000 | Izumi et al. | 428/694 ML |
| 6,139,980 A * | 10/2000 | Matsumoto | 428/692 |
| 6,335,908 B1 * | 1/2002 | Tanase et al. | 369/13.17 |

FOREIGN PATENT DOCUMENTS

| | | |
|---|---|---|
| JP | 5-159270 | 6/1993 |
| JP | 5-290430 | 11/1993 |
| JP | 8-153345 | 6/1996 |
| JP | 8-221811 | 8/1996 |

OTHER PUBLICATIONS

The Magnetics Society of Japan; Proceedings of Magneto-Optical Recording International Symposium '92, vol. 17, Supplement No. S1 (1993), pp. 201–204.

* cited by examiner

*Primary Examiner*—Ali Neyzari
(74) *Attorney, Agent, or Firm*—Armstrong, Westerman & Hattori, LLP

(57) ABSTRACT

In a magneto-optical recording medium comprising a recording layer and a reproducing layer, a transfer layer and a magnetic shielding layer are successively formed between the recording layer and the reproducing layer respectively. The reproducing layer is prepared from $Gd_{33}(Fe_{70}Co_{30})_{67}$ changing from an in-plane magnetization film to a perpendicular magnetization film at 150° C., for example. The transfer layer is prepared from $Gd_{28}(Fe_{90}Co_{10})_{72}$ changing from an in-plane magnetization film to a perpendicular magnetization film at 50° C., for example. The magnetic shielding layer is prepared from SiN, for example. The recording layer is prepared from $Tb_{20}(Fe_{90}Co_{10})_{80}$ whose saturation magnetization is maximized around the transition temperature of 50° C. of the transfer layer. A signal can be directly recorded in the recording layer with no magnetic influence from the reproducing layer. A magnetic domain in the recording layer is transferred into the transfer layer by static magnetic interaction, and further transferred into the reproducing layer by exchange interaction. Thus, the signal can be stably reproduced in high density.

5 Claims, 9 Drawing Sheets

MAGNETO-OPTICAL RECORDING MEDIUM COMPRISING RECORDING LAYER AND REPRODUCING LAYER

This application is a Divisional of prior application Ser. No. 09/160,045, now U.S. Pat. No. 6,400,656 filed on Sep. 25, 1998 which is hereby incorporated by reference.

BACKGROUND OF THE INVENTION

1. Field of the Invention

The present invention relates to a magneto-optical recording medium, and more specifically, it relates to a magneto-optical recording medium comprising a recording layer for recording a signal and a reproducing layer for reproducing the signal after transferring a magnetic domain in the recording layer.

2. Description of the Background Art

A magneto-optical recording medium, which is noted as a reloadable and highly reliable recording medium having a large storage capacity, is put into practice as a computer memory or the like, to come into wide use. Following increase in information content and downsizing of devices, a recording/reproducing technique of higher density is required.

A high-density recording/reproducing technique includes that for a device and that for a medium. The technique for the device includes optical super-resolution for obtaining a condensed spot beyond the diffraction limit for a laser beam, reduction of the wavelength of the laser beam and the like. The technique for the medium includes reduction of the pitch of the medium, improvement of reproducing resolution with a magnetic multilayer film and the like (refer to Y. Murakami et al. "Super Resolution Readout of a Magneto-Optical Disk with an In-Plane Magnetization Layer", Proceedings of Magneto-Optical Recording International Symposium '92, J. Magn. Soc. Jpn. Vol. 17, Supplement No. S1 (1993), pp. 201 to 204). The technique of improving the reproducing resolution with the magnetic multilayer film is adapted to selectively transfer a magnetic domain of a recording layer into a reproducing layer for reproducing the same through the temperature distribution of a laser spot forming Gaussian distribution around the center FIGS. 1A and 1B show the signal recording principle in a conventional magneto-optical recording medium having a recording layer 6 and a reproducing layer 3 which are in contact with each other. In order to record a signal in such a medium, a magnetic field Hx is applied from the recording layer 6 side while a laser beam LB is simultaneously applied from the reproducing layer 3 side. In general, the Curie temperature of the recording layer 6 is lower than that of the reproducing layer 3. When the signal is recorded, therefore, the temperature of the medium rises to a level between the Curie temperatures of the recording layer 6 and the reproducing layer 3 or higher than the Curie temperature of the reproducing layer 3. When the magnetic field Hx is applied from the exterior in such a state, a magnetic domain 30 magnetized in the same direction as the magnetic field Hx is formed in the reproducing layer 3 as shown in FIG. 1A. When the temperature of the region formed with the magnetic domain 30 is thereafter reduced below the Curie temperature of the recording layer 6, the magnetic domain 30 in the reproducing layer 3 is transferred into the recording layer 6 by exchange interaction, to define a magnetic domain 60 in the recording layer 6 as shown in FIG. 1B.

In order to record the signal in such a conventional medium, therefore, recording conditions must be decided in consideration of the characteristics of the recording layer 6 and the reproducing layer 3. The signal is recorded by exchange interaction from the reproducing layer 3 to the recording layer 6, whereby the magnetic properties of the reproducing layer 3 exert influence on the signal recording. While the magnetic influence from the reproducing layer 3 to the recording layer 6 can be reduced by increasing the temperature of the reproducing layer 3 beyond the Curie temperature, higher laser power is required in this case since the Curie temperature of the reproducing layer 3 is higher than that of the recording layer 6. In order to transfer the magnetic domain 30 in the reproducing layer 3 into the recording layer 6 by exchange interaction, further, the Curie temperature of the reproducing layer 3 must be increased beyond that of the recording layer 6.

In order to reproduce the signal from such a conventional medium, on the other hand, the transition temperature at which the reproducing layer 3 changes from an in-plane magnetization film to a perpendicular magnetization film must be increased since the magnetic domain 60 in the recording layer 6 is selectively transferred into the reproducing layer 3 by exchange interaction. Thus, the laser power must be increased, and the temperature of the recording layer 6 so rises that selectivity for the magnetic domain 60 transferred from the recording layer 6 into the reproducing layer 3 is reduced as a result.

SUMMARY OF THE INVENTION

An object of the present invention is to provide a magneto-optical recording medium which can stably record a signal in a recording layer with no influence by magnetization of a reproducing layer.

Another object of the present invention is to provide a magneto-optical recording medium which can record a signal with low laser power.

Still another object of the present invention is to provide a magneto-optical recording medium which can record a signal in higher density.

A further object of the present invention is to provide a magneto-optical recording medium having high selectivity for a magnetic domain transferred from a recording layer into a reproducing layer.

The magneto-optical recording medium according to the present invention comprises a first reproducing layer, a magnetic shielding layer and a first recording layer. The first reproducing layer changes from an in-plane magnetization film to a perpendicular magnetization film at a first transition temperature. The magnetic shielding layer is formed on the first reproducing layer. The first recording layer is formed on the magnetic shielding layer, and saturation magnetization thereof is maximized around the first transition temperature.

Preferably, the magneto-optical recording medium further comprises a second reproducing layer. The second reproducing layer is formed on the first reproducing layer oppositely to the magnetic shielding layer, and changes from an in-plane magnetization film to a perpendicular magnetization film at a second transition temperature which is higher than the first transition temperature.

Preferably, the magneto-optical recording medium further comprises a second recording layer which is formed on the first recording layer in a compensating composition.

Preferably, the first recording layer includes a plurality of magnetic films and a plurality of non-magnetic films which are formed alternately with the plurality of magnetic films.

In the aforementioned magneto-optical recording medium, the magnetic shielding layer is formed between the first recording layer and the first reproducing layer, whereby a signal is directly recorded in the first recording layer. Thus, the first recording layer is not magnetically influenced by the first reproducing layer, whereby the signal can be correctly recorded with low laser power. On the other hand, the magnetic domain formed in the first recording layer is transferred into the first reproducing layer by static magnetic interaction at the first transition temperature, and further transferred into the reproducing layer by exchange interaction at the second transition temperature. Thus, the magnetic domain is transferred from the first recording layer into the first reproducing layer at a temperature lower than that in the prior art, whereby the laser power for reproduction can be reduced to improve selectivity of the magnetic domain from the first recording layer to the first reproducing layer.

The second reproducing layer is further formed on the first reproducing layer, whereby the magnetic domain transferred into the first reproducing layer is further transferred into the second reproducing layer. Therefore, the selectivity for the magnetic domain from the first recording layer to the reproducing layer is further improved so that the signal can be reproduced in higher density.

The second recording layer is formed on the first recording layer in the compensating composition, whereby the signal can be further stably recorded in the first recording layer.

The plurality of magnetic films and the plurality of non-magnetic films are alternately formed on the first recording layer, whereby the non-magnetic films prevent thermal diffusion in the first recording layer and the laser power can be further reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
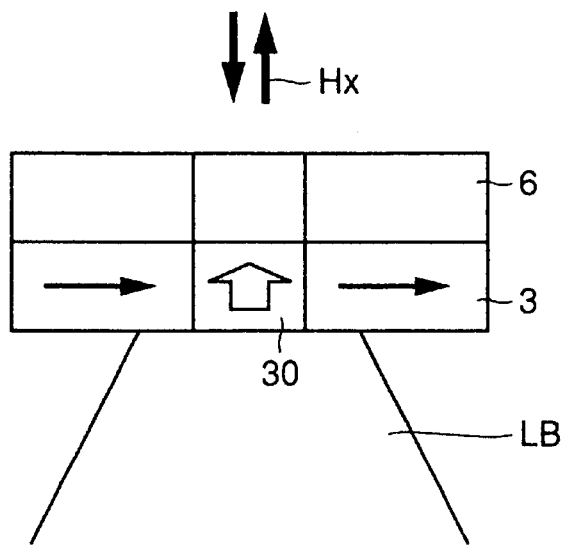
FIGS. 1A and 1B are adapted to illustrate the signal recording principle of a conventional magneto-optical recording medium.
Figure 1B:
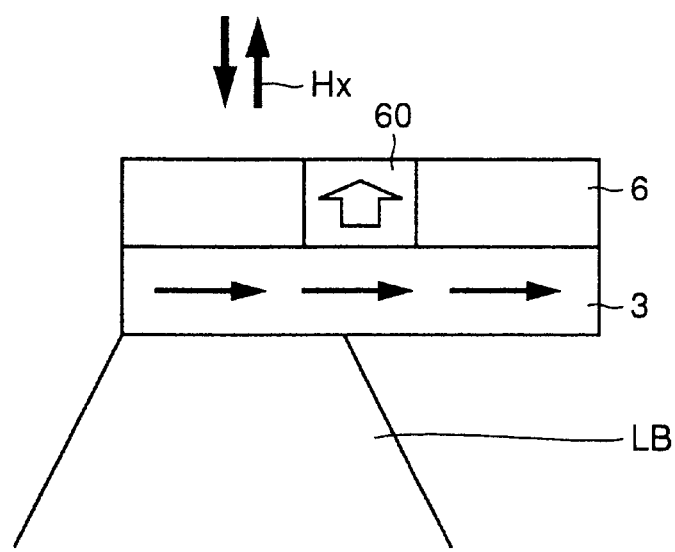

Embodiments of the present invention are now described in detail with reference to the drawings. In relation to the drawings, parts identical or corresponding to each other are denoted by the same reference numerals, to omit redundant description.

First Embodiment

Figure 2:
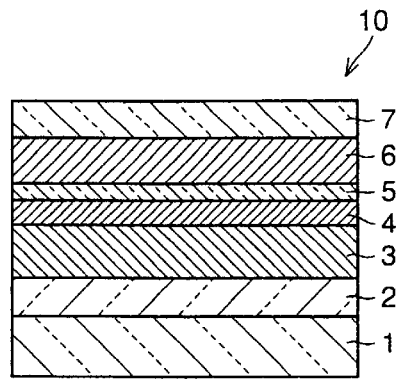
FIG. 2 is a sectional view showing the structure of a magneto-optical recording medium according to a first embodiment of the present invention.

Referring to FIG. 2, a magneto-optical recording medium 10 according to a first embodiment of the present invention comprises a transparent substrate 1, an interference layer 2 formed on the transparent substrate 1, a reproducing layer (main reproducing layer) 3 formed on the interference layer 2, a transfer layer (auxiliary reproducing layer) 4 formed on the reproducing layer 3, a magnetic shielding layer 5 formed on the transfer layer 4, a recording layer 6 formed on the magnetic shielding layer 5, and a protective layer 7 formed on the recording layer 6.

The transparent substrate 1 consists of polycarbonate. The interference layer 2 consists of SiN. The reproducing layer 3 consists of $Gd_{33}(Fe_{70}Co_{30})_{67}$. The transfer layer 4 consists of $Gd_{23}(Fe_{90}Co_{10})_{72}$. The magnetic shielding layer 5 consists of SiN. The recording layer 6 consists of $Tb_{20}(Fe_{90}Co_{10})_{80}$. The protective layer 7 consists of SiN. The interference layer 2, the reproducing layer 3, the transfer layer 4, the magnetic shielding layer 5, the recording layer 6 and the protective layer 7 are formed by RF sputtering. The thicknesses of the interference layer 2, the reproducing layer 3, the transfer layer 4, the magnetic shielding layer 5, the recording layer 6 and the protective layer 7 are 700 Å, 1000 Å, 500 Å, 150 Å, 500 Å and 700 Å respectively.

The reproducing layer 3 and the transfer layer 4 are in-plane magnetization films at the room temperature (0 to 50° C., preferably 10 to 30° C.). The reproducing layer 3 changes from the in-plane magnetization film to a perpendicular magnetization film at a transition temperature of 150° C. The transfer layer 4 changes from the in-plane magnetization film to a perpendicular magnetization film at a transition temperature of 50° C. Saturation magnetization of the recording layer 6 is maximized around the transition temperature of 50° C. of the transfer layer 4.

Figure 3:
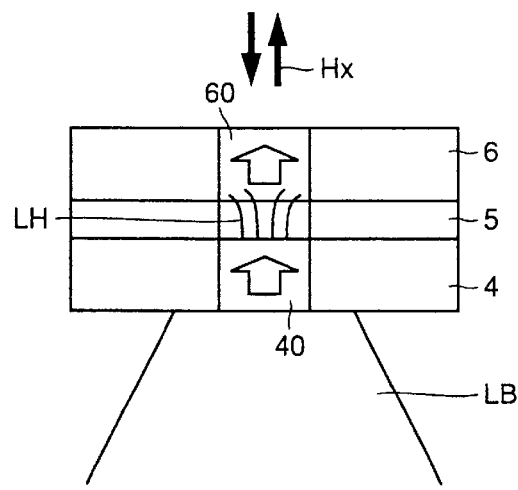
FIG. 3 is adapted to illustrate the signal recording principle of the magneto-optical recording medium shown in FIG. 2.

In order to record a signal in such a medium 10, a laser beam LB is applied as shown in FIG. 3, to increase the temperature of the medium 10 beyond the Curie temperature of the recording layer 6. At this time, the temperatures of the transfer layer 4 and the reproducing layer 3 are also higher than the Curie temperature. After a magnetic field Hx is applied from the exterior in such a state, the temperature of the medium 10 is reduced below the Curie temperature of the recording layer 6, whereby magnetic domains 40 and 60 which are magnetized in the same direction as the applied magnetic field Hx are formed in the transfer layer 4 and the recording layer 6 respectively. Due to the presence of the magnetic shielding layer 5 between the recording layer 6 and the magnetic layer 4, however, no exchange interaction takes place between the recording layer 6 and the transfer layer 4. Although a leakage magnetic field LH from the magnetic domain 40 may exert magnetic influence on the magnetic domain 60, this leakage magnetic field LH is smaller than the externally applied magnetic field Hx. Therefore, the magnetic domain 60 results from only the externally applied magnetic field Hx with no magnetic influence by the magnetic domain 40. In other words, signal recording conditions of the recording layer 6, which are decided only by the characteristics thereof, may not be decided in consideration of the characteristics of both of the reproducing layer 3 and the recording layer 6, dissimilarly to the conventional magneto-optical recording medium.

Figure 4:
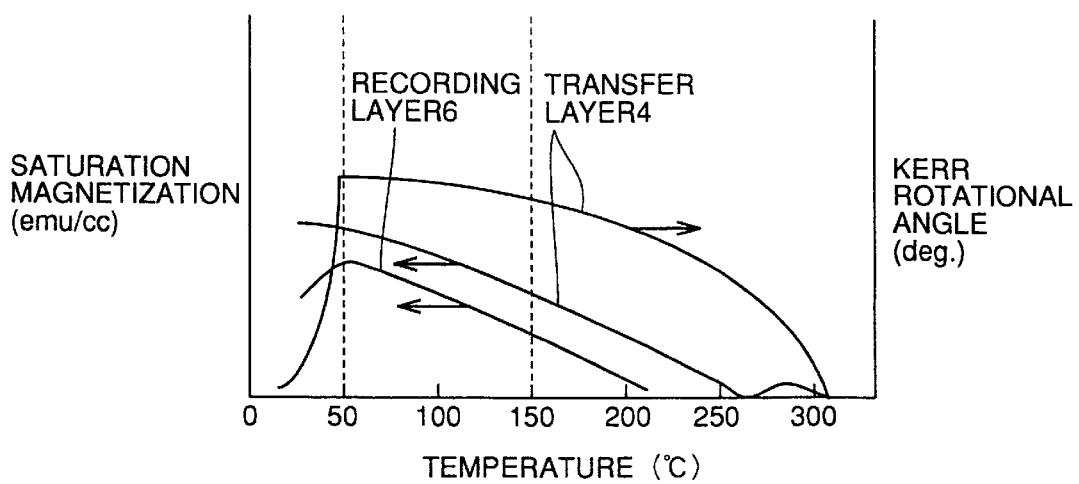
FIG. 4 is a characteristic diagram showing temperature dependency of saturation magnetization of a recording layer and a transfer layer, and the Kerr rotational angle of the transfer layer shown in FIG. 2.

As shown in FIG. 4, saturation magnetization of $Tb_{20}(Fe_{90}Co_{10})_{80}$ employed for the recording layer 6 is increased as the temperature rises from the room temperature, maximized at a temperature around 50° C., and then reduced as the temperature rises beyond 50° C. On the other hand, saturation magnetization of $Gd_{28}(Fe_{90}Co_{10})_{72}$ employed for the transfer layer 4 is reduced as the temperature rises in the range between the room temperature and about 260° C. Large saturation magnetization corresponds to a large leakage magnetic field, to readily result in magnetic transfer by static magnetic interaction. $Gd_{28}(Fe_{90}Co_{10})_{72}$ employed for the transfer layer 4 changes from an in-plane magnetization film to a perpendicular magnetization film at a temperature around 50° C., whereby a Kerr rotational angle abruptly increases at about 50° C.

Figure 5A:
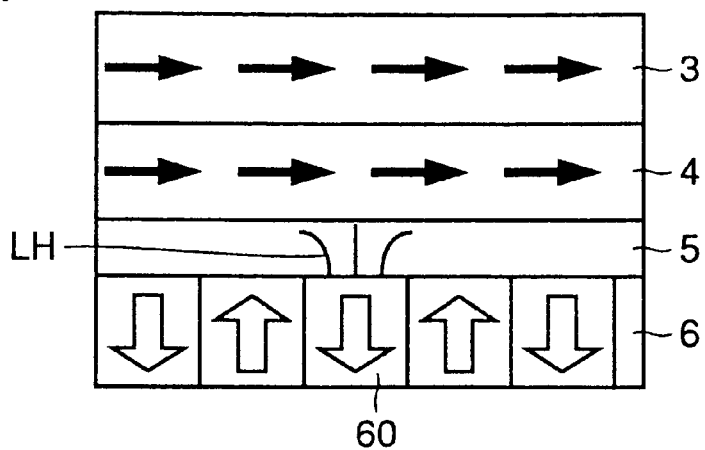
FIGS. 5A to 5C are adapted to illustrate the signal reproduction principle of the magneto-optical recording medium shown in FIG. 2.

When the magneto-optical recording medium 10 is at the room temperature, the reproducing layer 3 and the transfer layer 4 are in-plane magnetization films, as shown in FIG. 5A. The recording layer 6 is a perpendicular magnetization film provided with magnetic domains, including a magnetic domain 60, alternately magnetized in different directions, thereby recording a signal. A leakage magnetic field LH is generated from the magnetic domain 60 of the recording layer 6.

Figure 5B:
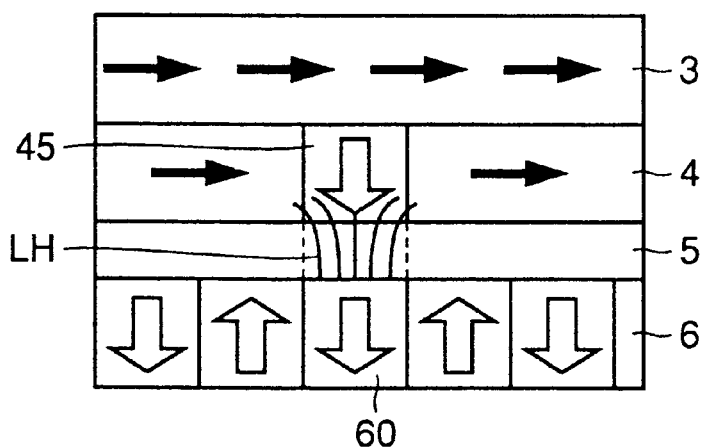

Then, a laser beam is applied from the reproducing layer 3 side, whereby the temperature of the medium 10 so rises that the leakage magnetic field LH generated from the magnetic domain 60 of the recording layer 6 is maximized to exert magnetic influence on the transfer layer 4 when the temperature approaches 50° C., as shown in FIG. 5B. The transfer layer 4 is transformed from the in-plane magnetization film to a perpendicular magnetization film at about 50° C., whereby a magnetic domain 45 magnetized in the same direction as the magnetic domain 60 is formed in the transfer layer 4 by static magnetic interaction. At this time, the reproducing layer 3 remains the in-plane magnetization film.

Figure 5C:
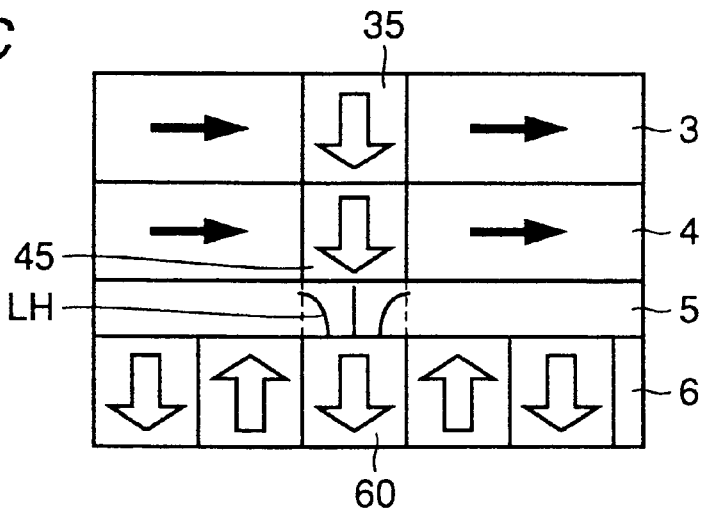

Then, the temperature of the magneto-optical recording medium 10 further rises to about 150° C., whereby the reproducing layer 3 is transformed from the in-plane magnetization film to a perpendicular magnetization film, whereby a magnetic domain 35 is formed in the reproducing layer 3 due to transfer by exchange interaction from the transfer layer 4, as shown in FIG. 5C. Consequently, the magnetic domain 35 transferred into the reproducing layer 3 is detected with the laser beam, whereby the signal recorded in the magnetic domain 60 of the recording layer 6 is reproduced. Saturation magnetization of the recording layer 6 is small around 150° C. as shown in FIG. 4, to reduce influence by the leakage magnetic field LH generated from the magnetic domain 60.

According to the first embodiment of the present invention, as hereinabove described, the magnetic shielding layer 5 is formed between the reproducing layer 3 and the recording layer 6, whereby the signal can be directly recorded in the recording layer 6 with no magnetic influence from the reproducing layer 3. Thus, the signal can be correctly recorded in high density with low laser power without increasing the temperature of the medium 10 beyond the Curie temperature of the reproducing layer 3. Further, the magnetic materials for the recording layer 6 and the reproducing layer 3 may not be selected in consideration of the relation between the Curie temperatures thereof. In addition, the signal is reproduced by transferring the magnetic domain 60 from the recording layer 6 into the transfer layer 4 by static magnetic interaction and further transferring the magnetic domain 45 into the reproducing layer 3 by exchange interaction, whereby the laser power can be suppressed for improving selectivity for the magnetic domain 60 from the recording layer 6 to the reproducing layer 3.

Further, the magnetic domain 60 in the recording layer 6 is transferred into the transfer layer 4 at the relatively low temperature of 50° C., whereby the laser power for reproduction can be reduced.

While the magnetic domains 60 and 45 are transferred at 50° C. and 150° C. respectively in this embodiment, the temperatures are not particularly restricted at these levels so far the transition temperature of the transfer layer 4 is lower than that of the reproducing layer 3.

While the material for the recording layer 6 is prepared from the magnetic substance whose saturation magnetization is maximized at a temperature of about 50° C., the recording layer 6 is not restricted to this material but can also be prepared from a magnetic substance whose saturation magnetization is maximized at a temperature substantially equal to the transition temperature at which the transfer layer 4 changes from an in-plane magnetization film to a perpendicular magnetization film.

The signal can be directly reproduced from the transfer layer 4, and the reproducing layer 3 may be omitted in this case. However, selectivity for the signal from the recording layer 6 is improved when the reproducing layer 3 is formed. In this case, the reproducing layer 3 is preferably prepared from a magnetic substance having a large Kerr rotational angle.

Second Embodiment

Figure 6:
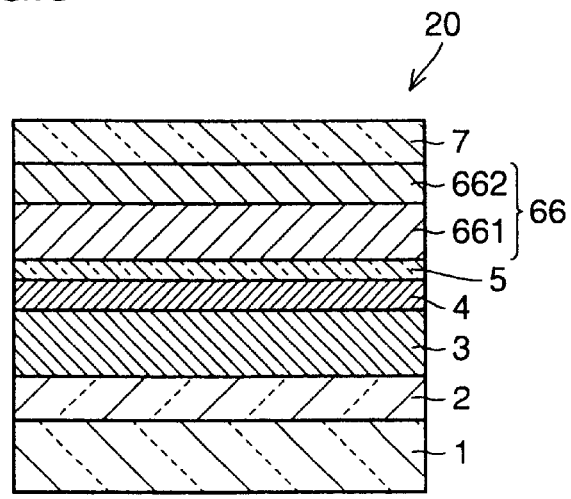
FIG. 6 is a sectional view showing the structure of a magneto-optical recording medium according to a second embodiment of the present invention.

Referring to FIG. 6, a magneto-optical recording medium 20 according to a second embodiment of the present invention includes a recording layer 6 of a two-layer structure. A recording layer 661 is formed on a magnetic shielding layer 5 is identical to the recording layer 6 shown in FIG. 2. Another recording layer 662 is formed on the recording layer 661 in a compensating composition whose coercive force is infinitized. The recording layer 662, which is formed by magnetron sputtering, consists of $Tb_{25}(Fe_{87}Co_{13})_{75}$. The thickness of the recording layer 662 is 500 Å.

Figure 7:
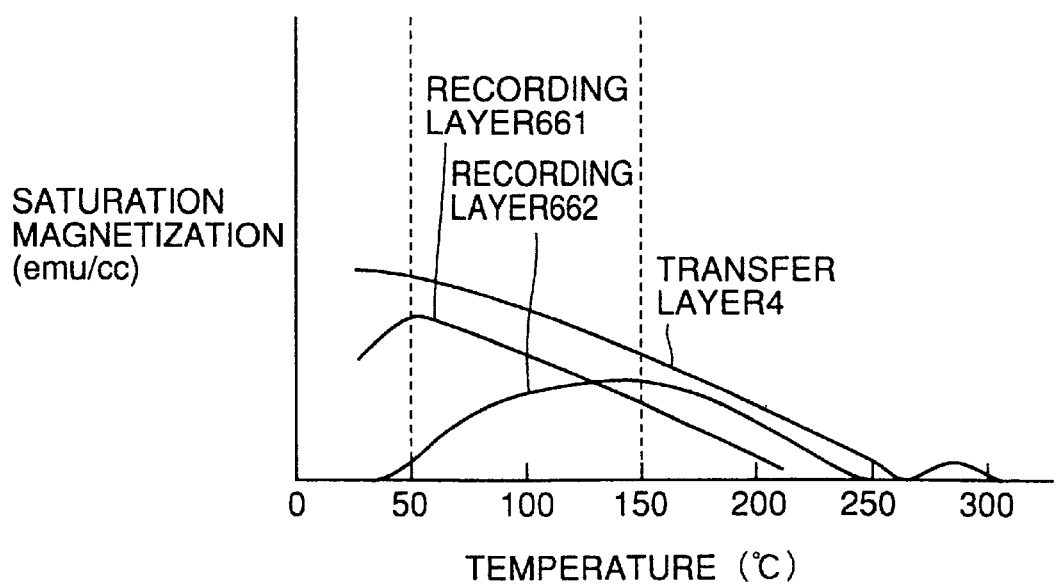
FIG. 7 is a characteristic diagram showing temperature dependency of saturation magnetization of two recording layers and a transfer layer shown in FIG. 6.

As shown in FIG. 7, temperature dependency of saturation magnetization of the transfer layer 4 and the recording layer 661 is identical to that shown in FIG. 4. Saturation magnetization of the recording layer 662 becomes zero at the room temperature. Namely, the coercive force which is inversely proportional to the saturation magnetization is infinitized at the room temperature. Further, saturation magnetization of the recording layer 662 becomes smaller than that of the recording layer 661 at a temperature of about 50° C.

In such a magneto-optical recording medium 20, a signal is directly recorded in the recording layers 661 and 662 with no influence from a reproducing layer 3. Thus, the magneto-optical recording medium 20 can correctly and stably record the signal similarly to that according to the first embodiment.

Figure 8A:
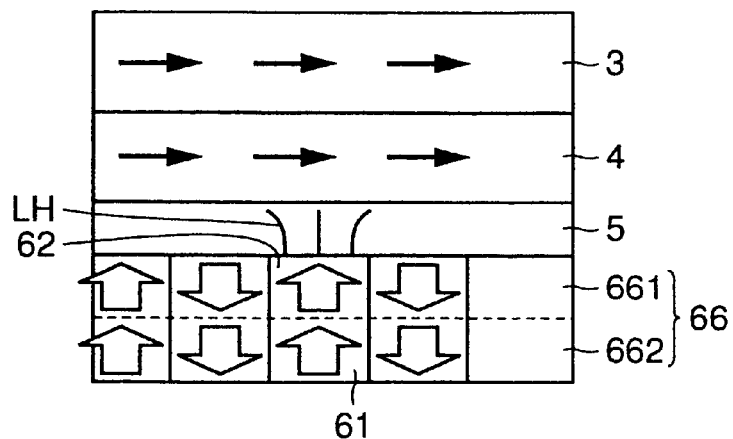
FIGS. 8A to 8C are adapted to illustrate the signal reproduction principle of the magneto-optical recording medium shown in FIG. 6.

When the medium 20 is at the room temperature, magnetic domains alternately magnetized in different directions are formed in the recording layer 66 as shown in FIG. 8A, thereby recording the signal. Saturation magnetization of the recording layer 662 is zero at the room temperature, whereby no leakage magnetic field is generated from a magnetic domain 61 in the recording layer 662. On the other hand, saturation magnetization of the recording layer 661 is nonzero at the room temperature, whereby a leakage magnetic field LH is generated from a magnetic domain 62 in the recording layer 661.

Figure 8B:
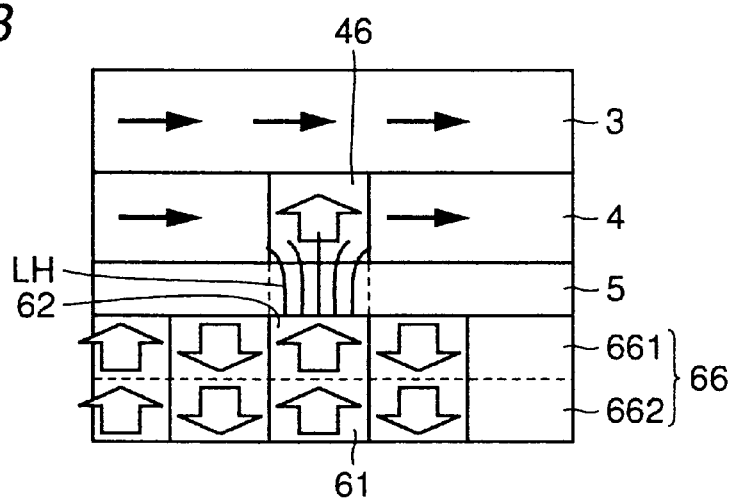

Then, a laser beam is applied from the reproducing layer 3 side to increase the temperature of the medium 20 to about 50° C., whereby the leakage magnetic field LH generated from the magnetic domain 62 in the recording layer 661 is maximized to exert magnetic influence on the transfer layer 4, as shown in FIG. 8B. The transfer layer 4 changes from an in-plane magnetization film to a perpendicular magnetization film at this temperature. Therefore, the magnetic domain 62 in the recording layer 661 is transferred into the transfer layer 4 by static magnetic interaction, to define a magnetic domain 46 magnetized in the same direction as the magnetic domain 62 in the transfer layer 4.

Figure 8C:
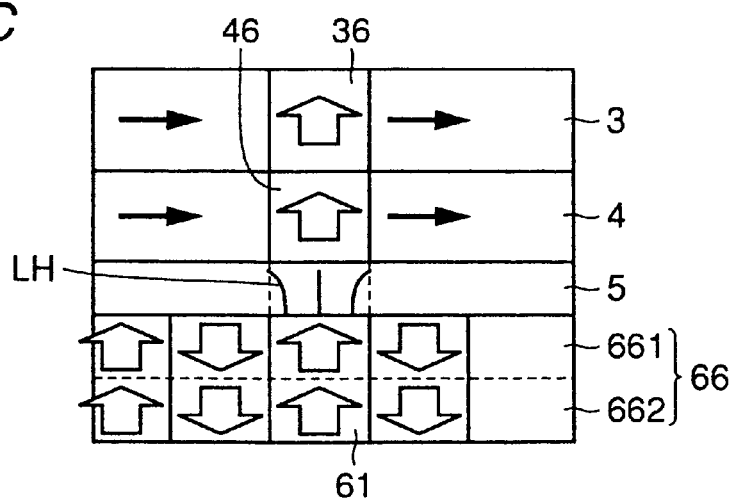

Then, the temperature of the medium 20 further rises to about 150° C., whereby the reproducing layer 3 changes from an in-plane magnetization film to a perpendicular magnetization film, as shown in FIG. 8C. Therefore, a magnetic domain 36 is formed in the reproducing layer 3 due to transfer from the transfer layer 4 by exchange interaction. This magnetic domain 36 is detected with the laser beam, whereby the signal recorded in the recording layer 662 is reproduced.

According to the second embodiment of the present invention, as hereinabove described, the recording layer 662 having infinite coercive force at the room temperature is formed on the recording layer 661, whereby the signal can be further stably recorded in the recording layer 66.

Third Embodiment

Figure 9:
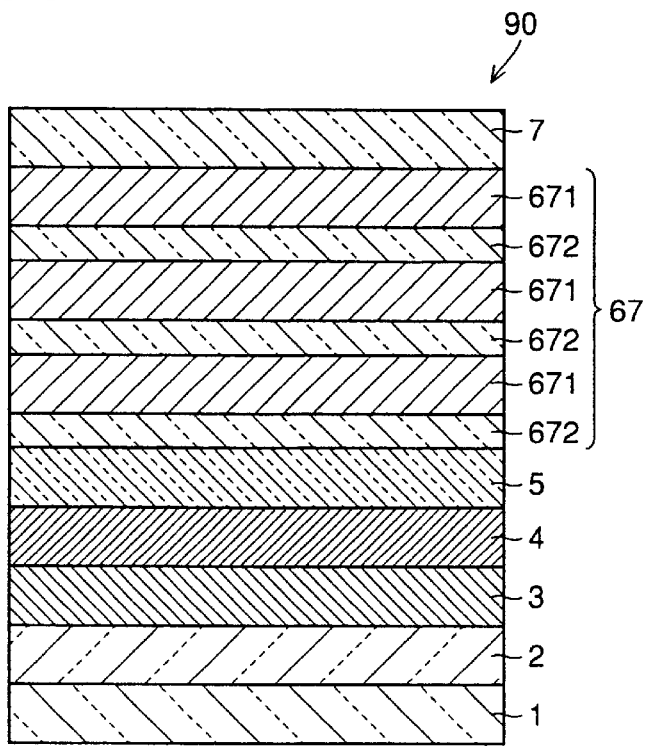
FIG. 9 is a sectional view showing the structure of a magneto-optical recording medium according to a third embodiment of the present invention.

Referring to FIG. 9, a magneto-optical recording medium 90 according to a third embodiment of the present invention includes a recording layer 67 having a multilayer structure. This recording layer 67 includes a plurality of magnetic films 671 and a plurality of non-magnetic films 672 which are formed alternately with the plurality of magnetic films 671. The magnetic films 671 consist of $Tb_{20}(Fe_{90}Co_{10})_{80}$. The non-magnetic films 672 consist of SiN. The thicknesses of the magnetic films 671 and the non-magnetic films 672 are 200 Å and 100 Å respectively. SiN forming the non-magnetic films 672 can be prepared by magnetron sputtering, whereby the medium 90 can be readily prepared by magnetron sputtering similarly to the above.

According to the third embodiment, as hereinabove described, the recording layer 67 is formed by the multilayer structure of the magnetic films 671 and the non-magnetic films 672, whereby the laser power in recording or reproduction can be reduced in addition to effects similar to those of the first embodiment. The magnetic films 671 and the non-magnetic films 672 are so alternately stacked with each other that the non-magnetic films 672 prevent diffusion of heat applied from a laser beam to the magnetic films 671, whereby the temperature of the magnetic films 671 can be increased beyond a prescribed level even if the laser beam is applied with lower power than that in the prior art. In other words, the temperature of the magnetic films 671 exceeds the Curie temperature thereof in recording and reaches 50° C. maximizing saturation magnetization in reproduction even if the laser beam is applied with smaller power than that in the prior art. Therefore, power consumption of a device necessary for recording/reproducing a signal in/from the medium 90 can be reduced.

While the recording layer 67 has the three-layer structure of the magnetic films 671 and the non-magnetic films 672, the number of the types of layers forming the recording layer 67 is not restricted to two. The thicknesses of the magnetic films 671 and the non-magnetic films 672, which are not particularly restricted either, are preferably in the range of 50 to 300 Å.

EXAMPLE

Figure 10:
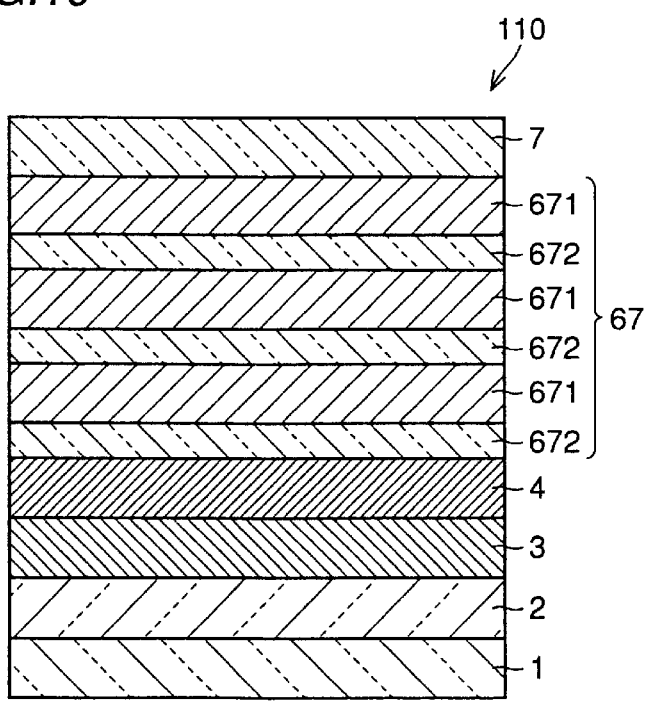
FIG. 10 is a sectional view showing the structure of a magneto-optical recording medium according to Example of the present invention.

In order to confirm the usefulness of the present invention, a magneto-optical recording medium 110 shown in FIG. 10 was prepared by forming an interference layer 2 consisting of SiN on a transparent substrate 1 consisting of polycarbonate resin, then forming a reproducing layer 3 consisting of $Gd_{33}Fe_{44}Co_{23}$ and a transfer layer 4 consisting of $Gd_{28}(Fe_{90}Co_{10})_{72}$, then alternately forming three non-magnetic layers 672 consisting of SiN and three magnetic films 671 consisting of $Tb_{20}(Fe_{90}Co_{10})_{80}$, and finally forming a protective layer 7 consisting of SiN. All these layers 2, 3, 4, 672, 671 and 7 were formed by magnetron sputtering. In this medium 110, the non-magnetic films 672 serve as magnetic shielding layers. The thicknesses of the interference layer 2, the reproducing layer 3, the transfer layer 4 and the protective layer 7 were set at 700 Å, 1000 Å, 500 Å and 700 Å respectively. The thicknesses of the non-magnetic films 672 and the magnetic films 671 were set at 100 Å and 200 Å respectively. Therefore, the total thickness of a recording layer 67 was 900 Å.

Figure 11:
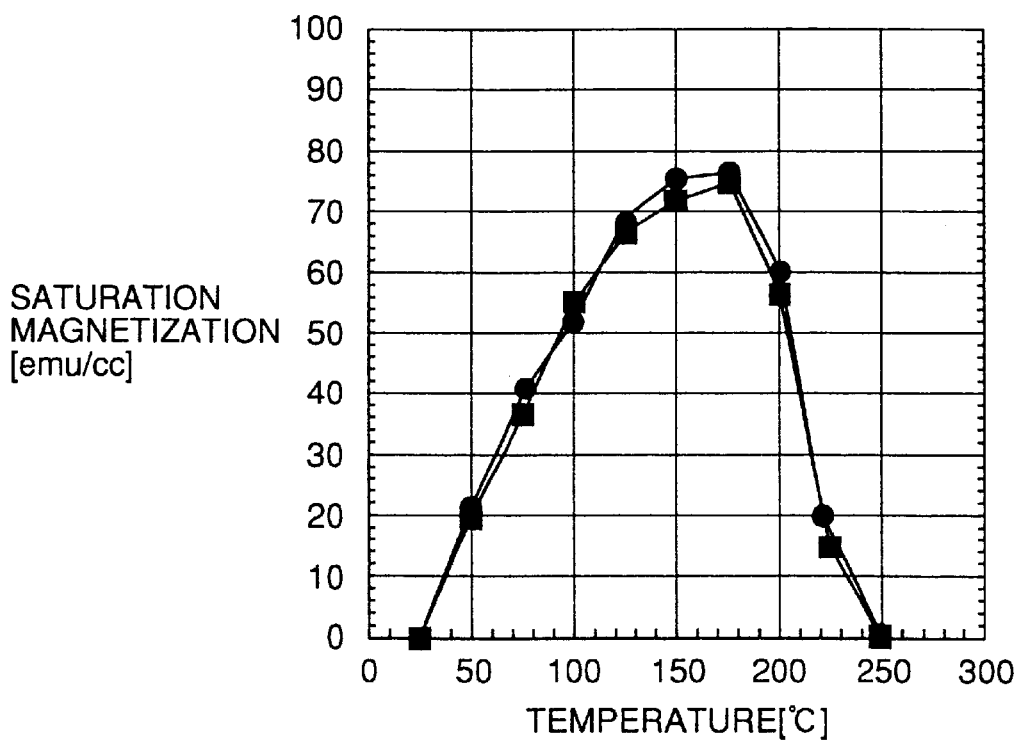
FIG. 11 is a characteristic diagram showing temperature dependency of saturation magnetization of the magneto-optical recording medium shown in FIG. 10 and a conventional magneto-optical recording medium.

FIG. 11 shows temperature dependency of saturation magnetization of the recording layer 67 in this magneto-optical recording medium 110 with marks ●. For the purpose of comparison, FIG. 11 also shows temperature dependency of saturation magnetization of a single recording layer consisting of $Tb_{20}Fe_{70}Co_{10}$ with marks ■. As clearly understood from FIG. 11, the recording layer 67 of a three-layer structure exhibited temperature dependency similar to that of the recording layer of the single-layer structure. In this recording layer 67, therefore, a leakage magnetic field is maximized at a temperature of about 170° C. maximizing saturation magnetization.

Figure 12:
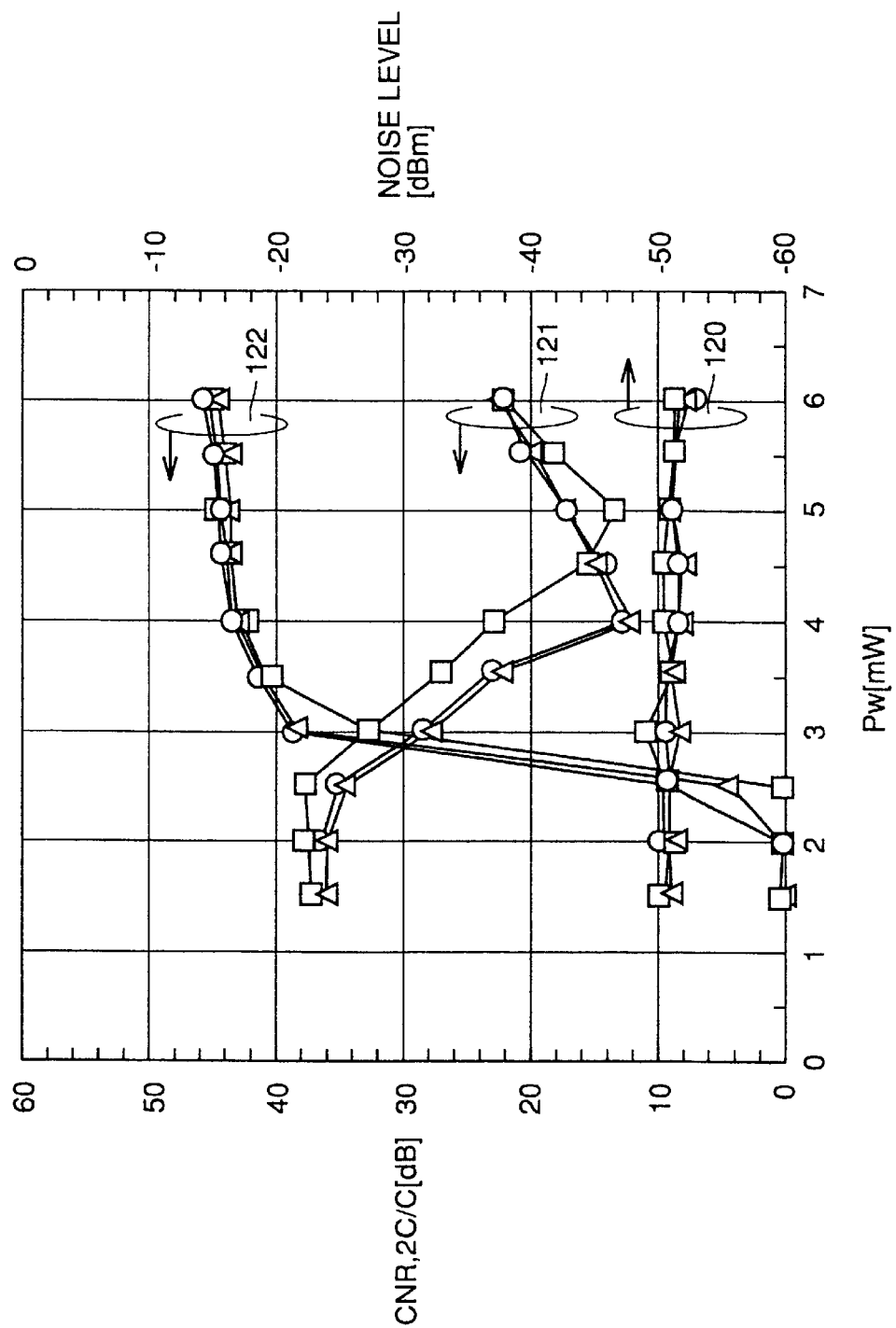
FIG. 12 is a characteristic diagram showing laser power dependency of carrier-to-noise ratios and noise levels of magneto-optical recording media according to Example of the present invention and a conventional magneto-optical recording medium.

FIG. 12 shows reproducibility of the magneto-optical recording medium 110 having the recording layer 67 of the three-layer structure. Referring to FIG. 12, a curve group 120 shows noise levels [dBm] with respect to power [mW] of a laser beam in recording. A curve group 121 shows strength values (2C/C) [dB] of second harmonics with respect to the power of the laser beam. A curve group 122 shows carrier-to-noise ratios (CNR) [dB] with respect to the power of the laser beam. Marks ○ and Δ show the medium 110 according to Example including the non-magnetic films 672 of 100 Å in thickness and another inventive magneto-optical recording medium including non-magnetic films of 200 Å in thickness. Marks □ show a conventional magneto-optical recording medium having a recording layer of a single-layer structure for comparison.

As understood from the curve group 120 shown in FIG. 12, the noise levels of the magneto-optical recording media according to Example and the conventional magneto-optical recording medium were substantially similar to each other. As understood from the curve group 121, the strength values of the second harmonics were minimized with laser power of 4 mW in the magneto-optical recording media ○ and Δ according to Example, while the strength values of second harmonics were minimized with laser power of 5 mW in the conventional magneto-optical recording medium □.

Figure 13:
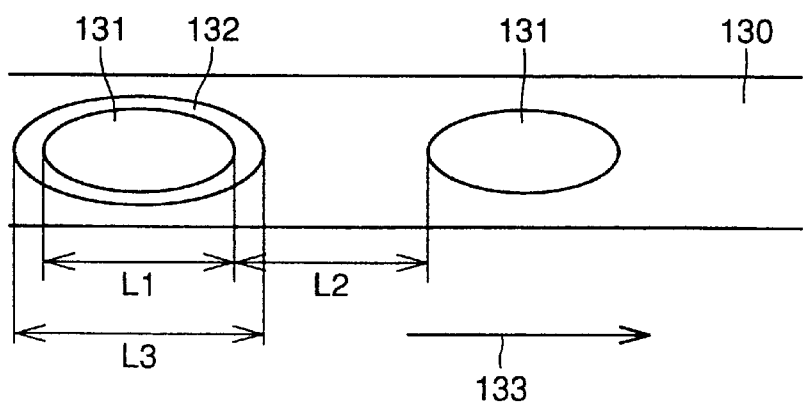
FIG. 13 is adapted to illustrate a second harmonic.

The second harmonic is now described with reference to FIG. 13. Domains 131 are formed on a track 130 of a magneto-optical recording medium so that the length L1 of each domain 131 along the track direction 133 is equal to the length L2 between the domains 131. In practice, however, any domain 131 may be lengthened along the track direction 133 by heat supplied from a laser beam to a magnetic film, to define a domain 132 of a length L3 (>L1). In order to determine whether or not the domains 131 are formed in a desired length, therefore, a recorded signal is reproduced at a frequency twice that in recording, for detecting the strength of the second harmonic. In this case, the strength of the second harmonic increases as the length L3 increases beyond the length L1. When the strength of the second harmonic is detected, therefore, it is possible to recognize the difference between the length of the formed domain and the desired length. Thus, the domain approaches the desired length as the strength of the second harmonic reduces.

As understood from the curve group 121 shown in FIG. 12, the power of the laser beam for recording can be reduced in the magneto-optical recording media ○ and Δ according to Example by 1 mW as compared with the conventional magneto-optical recording medium □.

As understood from the curve group 122, further, the power of the laser beam can be reduced in the magneto-optical recording media ○ and Δ according to Example by 0.5 mW as compared with the conventional magneto-optical recording medium □ when the C–N ratios remarkably rise.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium comprising:
   a first reproducing layer changing from an in-plane magnetization film to a perpendicular magnetization film at a first transition temperature;
   a magnetic shielding layer formed on said first reproducing layer;
   a first recording layer formed on said magnetic shielding layer whose saturation magnetization is maximized around said first transition temperature, and
   a second reproducing layer formed on said first reproducing layer oppositely to said magnetic shielding layer, said second reproducing layer changing from an in-plane magnetization film to a perpendicular magnetization film at a second temperature higher than said first transition temperature.

2. The magneto-optical recording medium in accordance with claim 1, wherein
   said magnetic shielding layer is made of SiN.

3. The magneto-optical recording medium in accordance with claim 1, further comprising:
   a second recording layer formed on said first recording layer in a compensating composition.

4. The magneto-optical recording medium in accordance with claim 1, wherein
   said first recording layer includes:
      a plurality of magnetic films, and
      a plurality of non-magnetic films formed alternately with said plurality of magnetic films.

5. A method of reproducing information from a magneto-optical recording medium comprising a reproducing layer changing from an in-plane magnetization film to a perpendicular magnetization film at a first transition temperature, a transfer layer, formed on said reproducing layer, changing from an in-plane magnetization film to a perpendicular magnetization film at a second transition temperature lower than said first transition temperature, a magnetic shielding layer formed on said transfer layer, and a recording layer, formed on said magnetic shielding layer, whose saturation magnetization is maximized around said second transition temperature, said method comprising the steps of:
   increasing the temperature of said magneto-optical recording medium to said second transition temperature to transfer a magnetic domain in said recording layer into said transfer layer by static magnetic interaction; and
   further increasing the temperature of said magneto-optical recording medium to said first transition temperature to transfer a magnetic domain in said transfer layer into said reproducing layer by exchange interaction.

* * * * *